United States Patent
Raju et al.

(10) Patent No.: US 7,415,706 B1
(45) Date of Patent: Aug. 19, 2008

(54) DYNAMIC HANDLING OF MULTIPLE SOFTWARE COMPONENT VERSIONS FOR DEVICE MANAGEMENT

(75) Inventors: Satyanarayana Raju, Union City, CA (US); David Anthony Tanner, Saratoga, CA (US); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 741 days.

(21) Appl. No.: 10/726,272

(22) Filed: Dec. 1, 2003

(51) Int. Cl.
  *G06F 9/44* (2006.01)
(52) U.S. Cl. ...................................... 717/170
(58) Field of Classification Search .................. 717/170
  See application file for complete search history.

(56) References Cited

U.S. PATENT DOCUMENTS

| | | | | |
|---|---|---|---|---|
| 4,558,413 A | | 12/1985 | Schmidt et al. | |
| 5,726,979 A | * | 3/1998 | Henderson et al. | 370/254 |
| 5,933,646 A | * | 8/1999 | Hendrickson et al. | 717/169 |
| 6,052,531 A | * | 4/2000 | Waldin et al. | 717/170 |
| 6,349,137 B1 | * | 2/2002 | Hunt et al. | 379/265.06 |
| 6,785,891 B1 | * | 8/2004 | Allen et al. | 719/313 |
| 7,240,364 B1 | * | 7/2007 | Branscomb et al. | 726/9 |
| 2002/0019864 A1 | * | 2/2002 | Mayer | 709/223 |
| 2002/0144256 A1 | * | 10/2002 | Budhiraja et al. | 717/174 |
| 2003/0140134 A1 | * | 7/2003 | Swanson et al. | 709/223 |
| 2003/0177223 A1 | * | 9/2003 | Erickson et al. | 709/224 |

\* cited by examiner

*Primary Examiner*—Wei Y. Zhen
*Assistant Examiner*—Philip R. Wang
(74) *Attorney, Agent, or Firm*—Hickman Palermo Truong & Becker LLP

(57) ABSTRACT

A method and an apparatus are disclosed for managing multiple software component versions. The method and apparatus detect a version change to one software component on a network. Then, the method and apparatus automatically identify other software components that both need to be changed to remain compatible with the changed software component and also depend on the changed software component.

32 Claims, 6 Drawing Sheets

DYNAMIC HANDLING OF MULTIPLE SOFTWARE COMPONENT VERSIONS FOR DEVICE MANAGEMENT

FIELD OF THE INVENTION

The present invention generally relates to management of computer networks. The invention relates more specifically to a method of dynamic handling of multiple software component versions.

BACKGROUND OF THE INVENTION

The methods described in this section could be practiced, but have not necessarily been previously conceived or pursued. Therefore, unless otherwise indicated herein, the methods described in this section are not prior art to the claims in this application and are not admitted to be prior art by inclusion in this section.

Computer networks that use routers, switches and other network elements are commonly managed using network management software systems. Examples of network management systems include Resource Management Essentials from Cisco Systems, Inc., San Jose, Calif., HP OpenView from Hewlett-Packard Company, Palo Alto, Calif., and others. Such network management systems are commonly used to manage multiple devices with various software components.

One of the shortcomings of these network management software systems is the use of mediation layers to handle multiple types of devices. These layers are responsible for converting data from different types of devices to a common format that can be consumed by the network management systems. As the network management systems manage increasing number of types of devices, the designs of such layers become more complex because of the need to accommodate more conversions. As a result, the operations of the network management systems become less efficient and less stable.

Another shortcoming of these network management software systems is the lack of automatic tracking and managing capabilities for multiple software component versions. Specifically, if a change in a software component version is detected, many such systems require a user of the systems to manually identify other software components that may be affected by the change, discard the outdated versions of the affected components, and download and install appropriate versions of software. In addition, the user often needs to manually shut down and restart the network management software systems for the newly installed software to take effect.

Based on the foregoing, there is a clear need for improved network management methods or systems that overcome the stated drawbacks of the current systems. There is a need to flexibly and effectively manage multiple types of devices and various software component versions.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of an example network system that one embodiment of a network management system managing multiple software component versions operates in;

DETAILED DESCRIPTION

Figure 1:
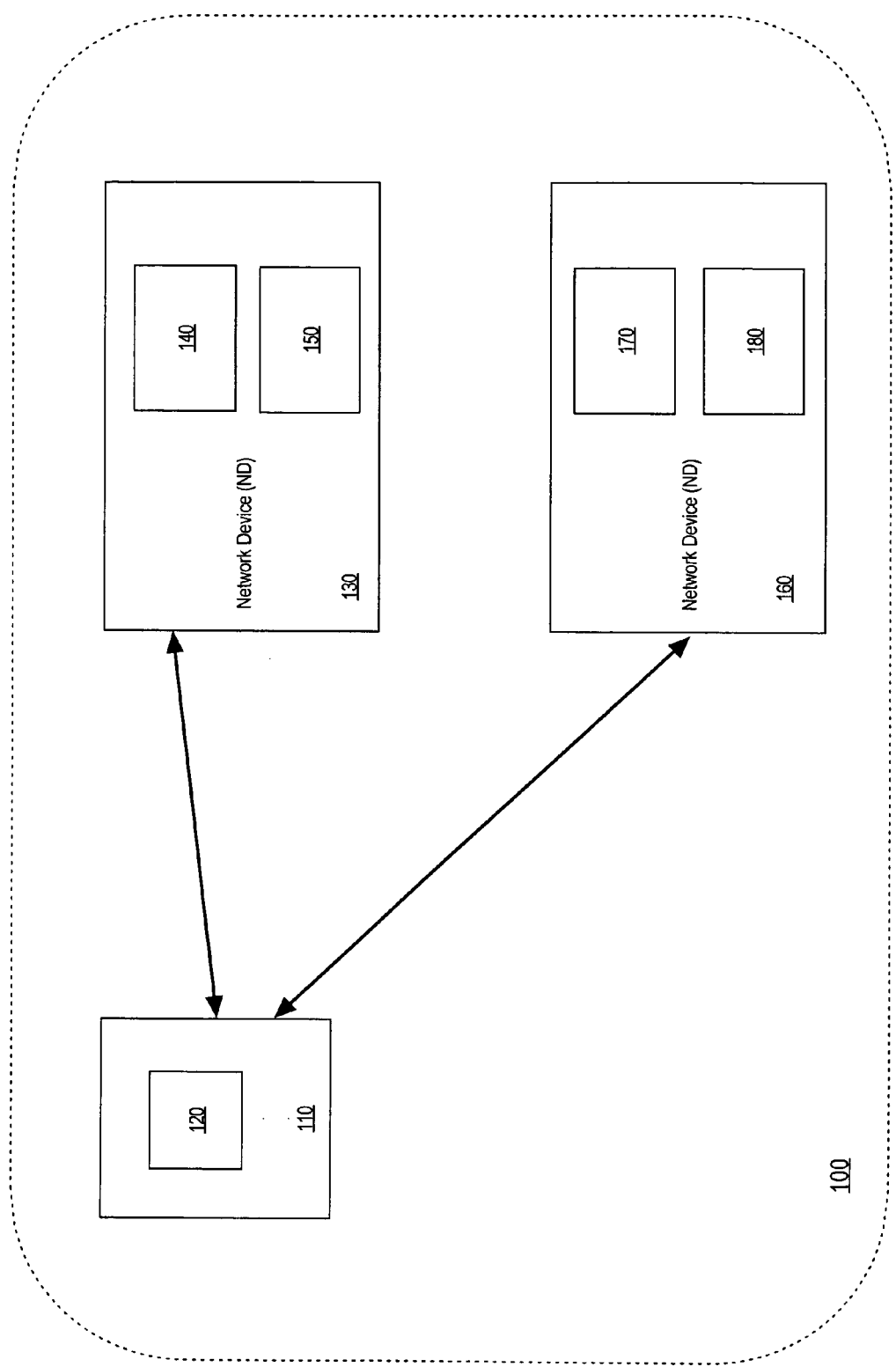

A method and apparatus for handling multiple software component versions are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Throughout this description, any two elements, such as Element A and Element B, are considered "compatible" when they are able to communicate with one another. In other words, Element A should recognize the device type of Element B and also the versions of software components that operate on Element B, and Element B should recognize the same of Element A. Also, the terms "element" and "device" and the terms "launch" and "instantiate" are used interchangeably throughout the description. Generally in programming, instantiation is the creation of a real instance or particular realization of an abstraction or template, such as a class of objects or a computer process. Thus, to instantiate is to create an instance by, for example, defining one particular variation of an object within a class, giving it a name, and locating it in some physical place.

Embodiments are described herein according to the following outline:

1.0 General Overview
2.0 Approaches to Dynamically Handle Multiple Software Component Versions for Device Management
   2.1 Example System Structures
      2.1.1 Example Network System
      2.1.2 Example Computer System
      2.1.3 Example Network Management System that Manages Multiple Software Component Versions
   2.2 Operation Flow
   2.3 Example Implementation
3.0 Example Extensions and Alternatives

1.0 GENERAL OVERVIEW

In one aspect, a method for managing versions of multiple software components on a network is disclosed. The method includes detecting a version change to one of the software components. The method further includes automatically identifying any software component on the network that depends on the changed software component. In addition, the method further narrows down such identified software components to a list of components that needs to be changed to be compatible with the changed software component.

According to an example feature, the method further includes automatically downloading such software components that both depend on the changed software component and also need to be changed to remain compatible with the changed software component. In one embodiment, the method includes collecting attributes of these identified software components and automatically manipulating the components according to the collected attributes. "Manipulating" here may include downloading the identified software components in one instance of performing the method and replacing an existing version of the identified software components with the newly downloaded versions in the same instance.

According to another example feature, the method further includes storing copies of the identified software components as discussed above in a cache. In addition, the method includes checking version information of the stored software components in the cache to determine whether the identified software components need to be downloaded.

In other aspects, the invention encompasses a computer apparatus and a computer-readable medium configured to carry out the foregoing steps.

2.0 APPROACHES TO DYNAMICALLY HANDLE MULTIPLE SOFTWARE COMPONENT VERSIONS FOR DEVICE MANAGEMENT

2.1 Example System Structures

2.1.1 Example Network System

FIG. 1 is a block diagram of an example network system that one embodiment of a network management system 120 managing multiple software component versions operates in.

A network system 100 includes a client computer 110 and multiple network devices, such as a first network device 130 and a second network device 160. A network device can be a router, a switch, a bridge, a server, a terminal, or any other element connected to a network. For purposes of illustrating a clear example, two network devices 130, 160 are shown in network system 100, but in a practical embodiment there may be any number of network devices.

The client computer 110 and the network devices 130, 160 support multiple software components, such as the network management system 120 and software components 140, 150, 170, and 180. Some examples of the components are, without limitation, command parsers, utility programs, and device agents. One example embodiment of the network management system 120 communicates with and manages components 140, 150, 170, and 180 and provides a graphical user interface to an operator of the client computer 110. Some example communication protocols between the network management system 120 and the network devices, such as 130 and 160, are, without limitation, Hyper Text Transfer Protocol ("HTTP") and Internet Inter-ORB Protocol ("IIOP"). Specific details of the network management system 120 are discussed in subsequent paragraphs.

2.1.2 Example Computer System

Figure 2:
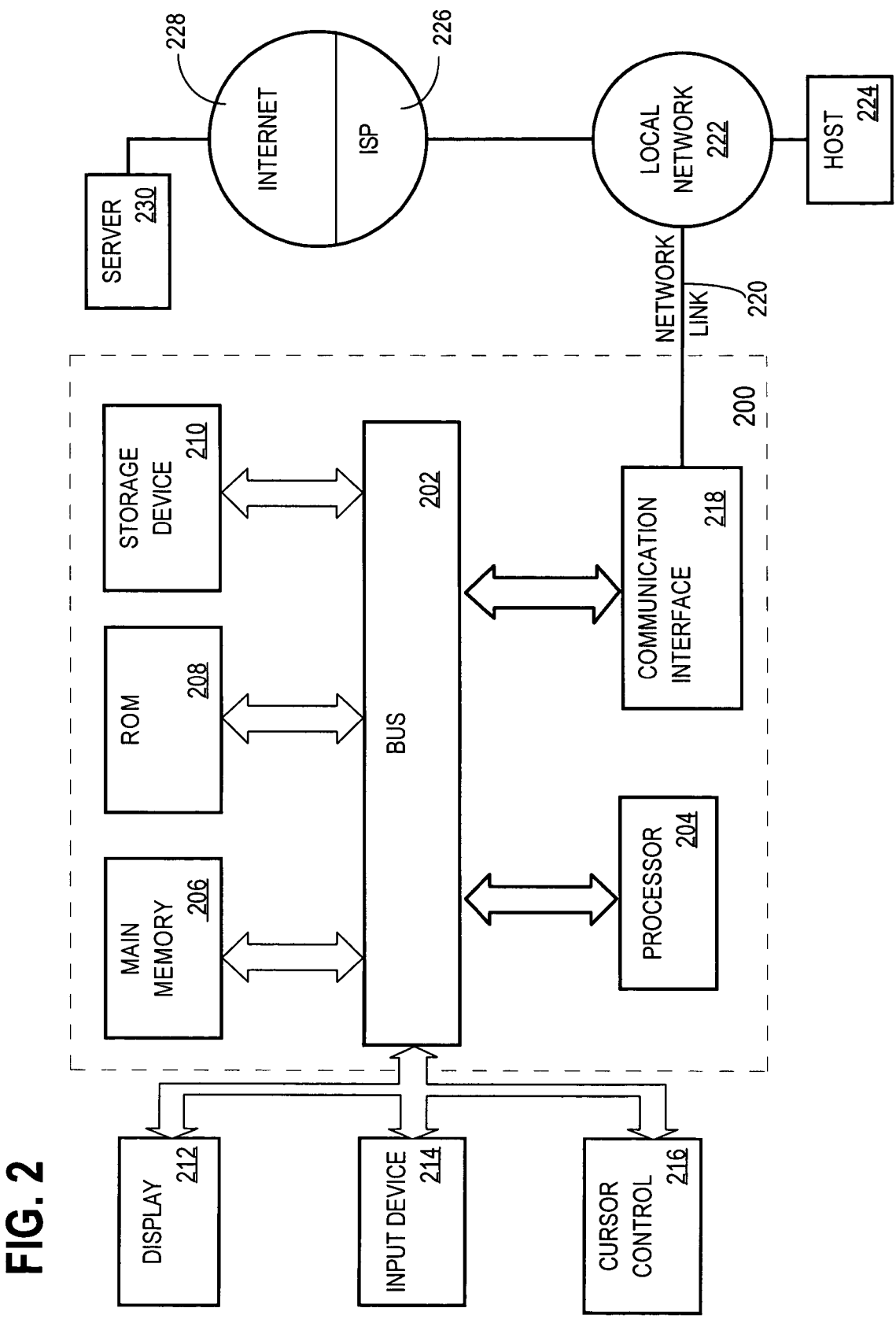
FIG. 2 is a block diagram of an example computer system upon which an embodiment of a method of managing multiple software component versions may be implemented.

FIG. 2 is a block diagram of an example computer system for the client computer 110 upon which an embodiment of the network management system 120 may be implemented.

Computer system 200 includes a bus 202 or other communication mechanism to transfer information, and a processor 204 coupled with bus 202 to process information. The computer system 200 also includes a main memory 206, such as a random access memory ("RAM") or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory ("ROM") 208 or other static storage device coupled to bus 202 for storing static information and instructions for processor 204. A storage device 210, such as a magnetic disk or optical disk, is provided and coupled to bus 202 for storing information and instructions.

The computer system 200 may be coupled via the bus 202 to a display 212, such as a cathode ray tube ("CRT"), an active matrix display, a liquid crystal display, or other display technologies, for displaying information to a computer user. An input device 214, such as alphanumeric keyboards or voice recognition devices, is coupled to bus 202 for communicating information and command selections to processor 204. Another type of user input device is cursor control 216, such as a mouse, trackball, stylus, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

In one example embodiment, the processor 204 of the computer system 200 provides the functionality of the network management system 120 by executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the network management system 120.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector can receive the data carried in the infrared signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

The computer system 200 also includes a communication interface 218 coupled to the bus 202. The communication interface 218 provides a two-way data communication coupling to a network link 220 that is connected to a local network 222. For example, the communication interface 218 may be an integrated services digital network ("ISDN") card or a modem to provide a data communication connection to a corresponding type of the network link 220. As another example, the communication interface 218 may be a local area network ("LAN") card to provide a data communication connection to a compatible LAN. Wireless links may also be implemented. In any such implementation, the communication interface 218 sends and receives electrical, electromagnetic or optical signals that carry digital data streams representing various types of information.

The network link 220 typically provides data communication through one or more networks to other data devices. For example, the network link 220 may provide a connection through the local network 222 to a host computer 224 or to data equipment operated by an Internet Service Provider ("ISP") 226. The ISP 226 in turn provides data communication services through the worldwide packet data communication network now commonly referred to as the "Internet" 228. The local network 222 and the Internet 228 both use electrical, electromagnetic or optical signals that carry digital data streams. The signals through the various networks and the signals on the network link 220 and through communication the interface 218 carry the digital data to and from the computer system 200.

Computer system 200 can send messages and receive data, including program code, through the network(s), the network link 220 and the communication interface 218. In the Internet example, a server 230 might transmit a requested code for an application program through the Internet 228, the ISP 226, the local network 222 and the communication interface 218. In accordance with the invention, one such downloaded application provides for the functionality of the network management system 120 as described herein.

The received code may be executed by processor 204 as it is received, and/or stored in storage device 210, or other non-volatile storage for later execution. In this manner, the computer system 200 may obtain application code.

Figure 3:
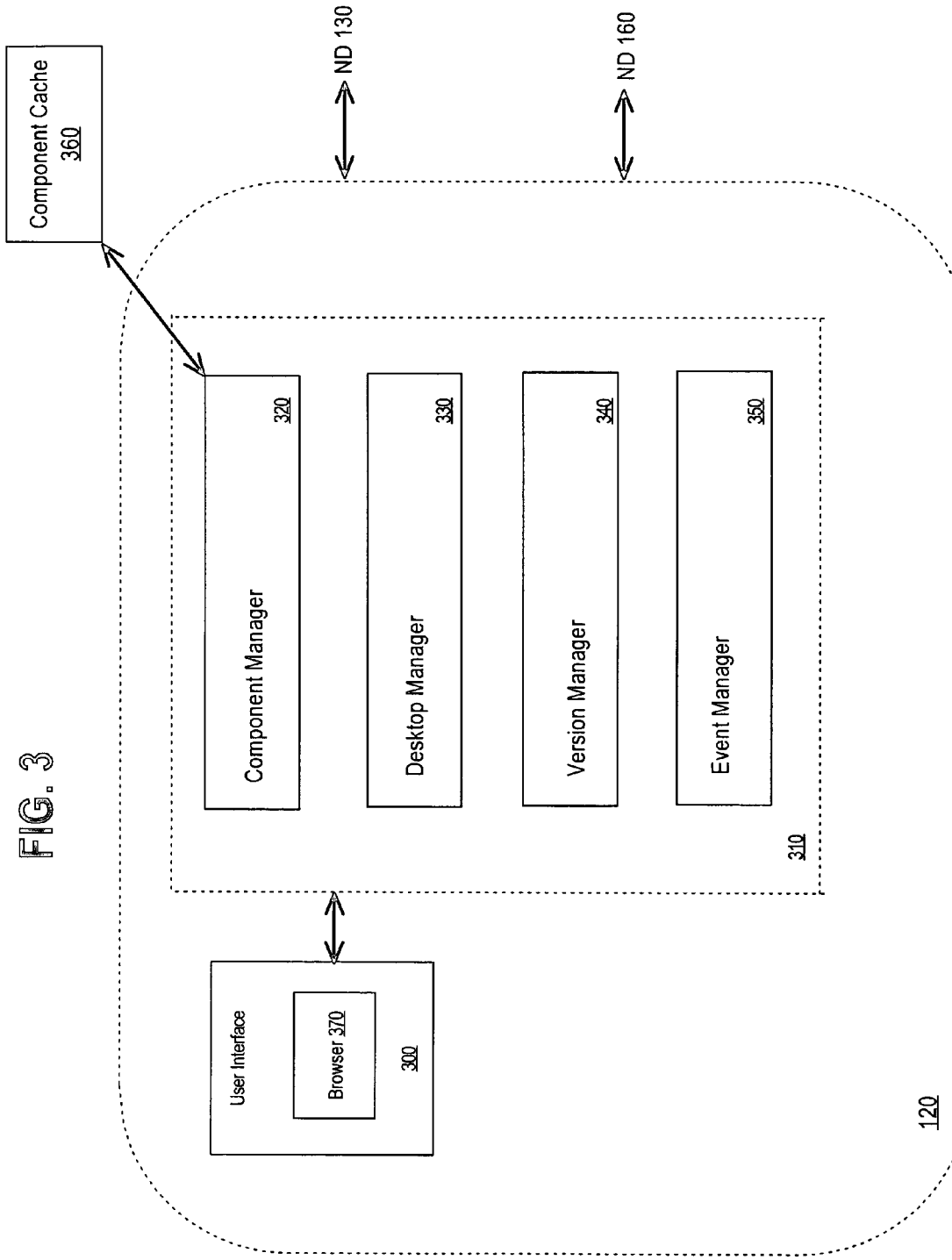
FIG. 3 is a block diagram of an example embodiment of a method of managing multiple software component versions.

2.1.3 Example Network Management System that Manages Multiple Software Component Versions FIG. 3 is a block diagram of an example embodiment of a network management system that manages multiple software component versions. In the example embodiment, the network management system 120 includes a user interface 300 and a processing engine 310. The user interface 300 may be rendered in a browser 370 or other display system suitable for presenting information generated by the processing engine 310. The browser 370 is a software application that is capable of presenting multimedia information to the operator. Some example browsers are, without limitation, the Netscape Navigator and the Internet Explorer. User interface 300 may be generated by a network management application or system that includes functions other than those described herein.

The processing engine 310 further includes a component manager 320, a desktop manager 330, a version manager 340, and an event manager 350. An operator of client computer 110 may monitor and manage the network system 100 with the network management system 120, which is executed on the computer.

The processing engine 310 is responsible for monitoring and responding to events that occur on the network system 100. One embodiment of the processing engine 310 further employs metadata driven interfaces to communicate with the network devices 130 and 160. In other words, rather than converting data from distinct types of devices to a common format before processing the data, the processing engine 310 uses metadata, which describe how and when and by whom a particular set of data was collected, and how the data is formatted, to interpret and process the data.

Furthermore, the desktop manager 330 in one embodiment of the processing engine 310 manages the overall operational flow of the processing engine. Some of the tasks that it performs include, without limitation, instantiation and initialization of other components in the processing engine 310.

The component manager 320 and the version manager 340 together ensure not only compatibility between the processing engine 310 and the software components on the network devices 130 and 160, but also compatibility among these various software components. When incompatibility is detected, the component manager 320 is responsible for replacing incompatible software components with compatible ones. In one implementation, when the processing engine 310 receives a software component, the software component is stored in a component cache 360.

The event manager 350 monitors certain events, such as a modification to a software component, on the network system 100 and alerts appropriate components of the processing engine 310 of the events. A particular implementation may either define such events before the instantiation of the processing engine 310 or dynamically define the events during the execution of the engine.

2.2 Operation Flow

Figure 4:
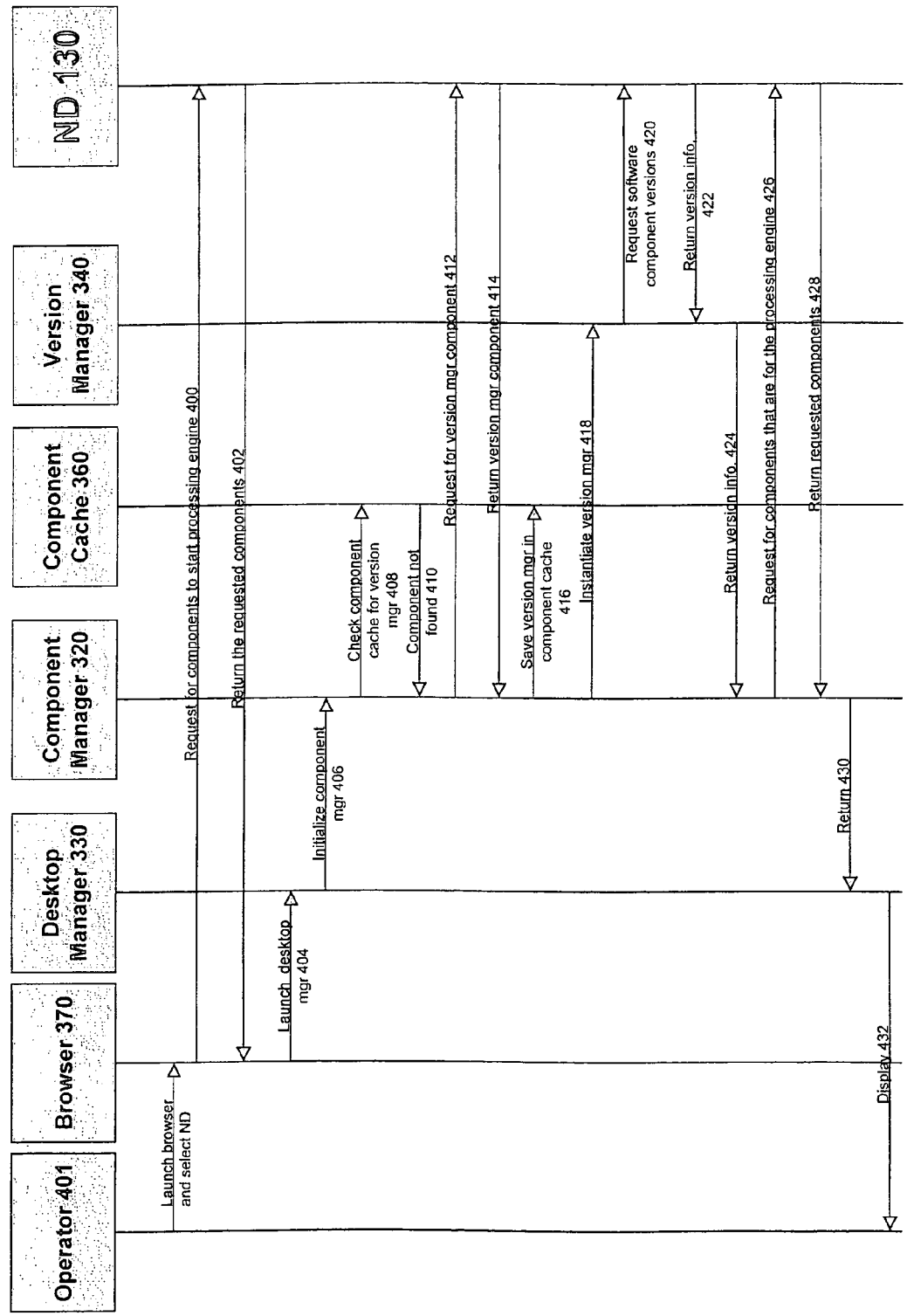
FIG. 4 illustrates a time sequence diagram for launching one example embodiment of a method of managing multiple software component versions.

FIG. 4 illustrates a time sequence diagram for launching one embodiment of the processing engine 310. For illustration purposes, the following description assumes that an operator 401 of the client computer 110 uses the network management system 120 that runs on the computer. Also, in conjunction with FIG. 3, the user interface 300 provides the operator 401 with choices of network devices to monitor. However, in alternative embodiments, functions of the operator 401 and browser 370 may be performed programmatically by an external system.

In operation according to one embodiment, the operator 401 launches an instance of the browser 370 in the user interface 300 and selects the network device 130 by clicking on a Uniform Resource Locator ("URL") on the browser 370 that corresponds to the device. In response, a launch applet from the network device 130 is loaded into the browser 370. The launch applet is a program that can be executed within another application, such as the browser 370. In one implementation, this applet is a JAVA applet. The launch applet requests the network device 130 for software components, such as a boot component, that may be needed to start the processing engine 310 at time 400. Then the applet receives the requested components from the network device at time 402.

With the requested components, the launch applet instantiates the desktop manager 330 at time 404. As mentioned above, the desktop manager 330 is responsible for managing the operational flow of the processing engine 310. During this launch sequence, the desktop manager 330 initializes the component manager 320 at time 406, so that the component manager 320 can evaluate the current states of the processing engine 310 without having to consider remnants from prior instances of the processing engine 310.

At time 408, the component manager 320 attempts to retrieve a current copy of the version manager 340 from the component cache 360. If the component manager 320 determines that the component cache 360 does not have a current copy of the version manager 340, the component manager 320 proceeds to request and receive a copy from the network device 130 at time 412 and 414, respectively. In one implementation, the component manager 320 stores the version manager 340 in the component cache 360 at time 416. Then at time 418, the component manager 320 instantiates the version manager 340.

Because one embodiment of the version manager 340 maintains the version numbers of the software components of the network device 130, such as software components 140 and 150 (FIG. 1), at time 420, the version manager 340 requests such version information from the network device 130. After the version manager 340 has the version information, it then passes on the information to the component manager 320 at time 424.

To manage and monitor the network device 130, one embodiment of the component manager 320 requests all the components that are specific to the device and are also relevant to the execution of the processing engine 310. Network device 130 determines which components are relevant, which may include fewer than all components 140, 150, and returns the components at time 428. After the component manager 320 receives the requested components at time 428, the component manager 320 passes the requested components along to the desktop manager 330. At time 440, one embodiment of the desktop manager 330 may cause the user interface 300 to generate display information, such as, without limitation, the status of the launch sequence, to the operator 401.

Figure 5:
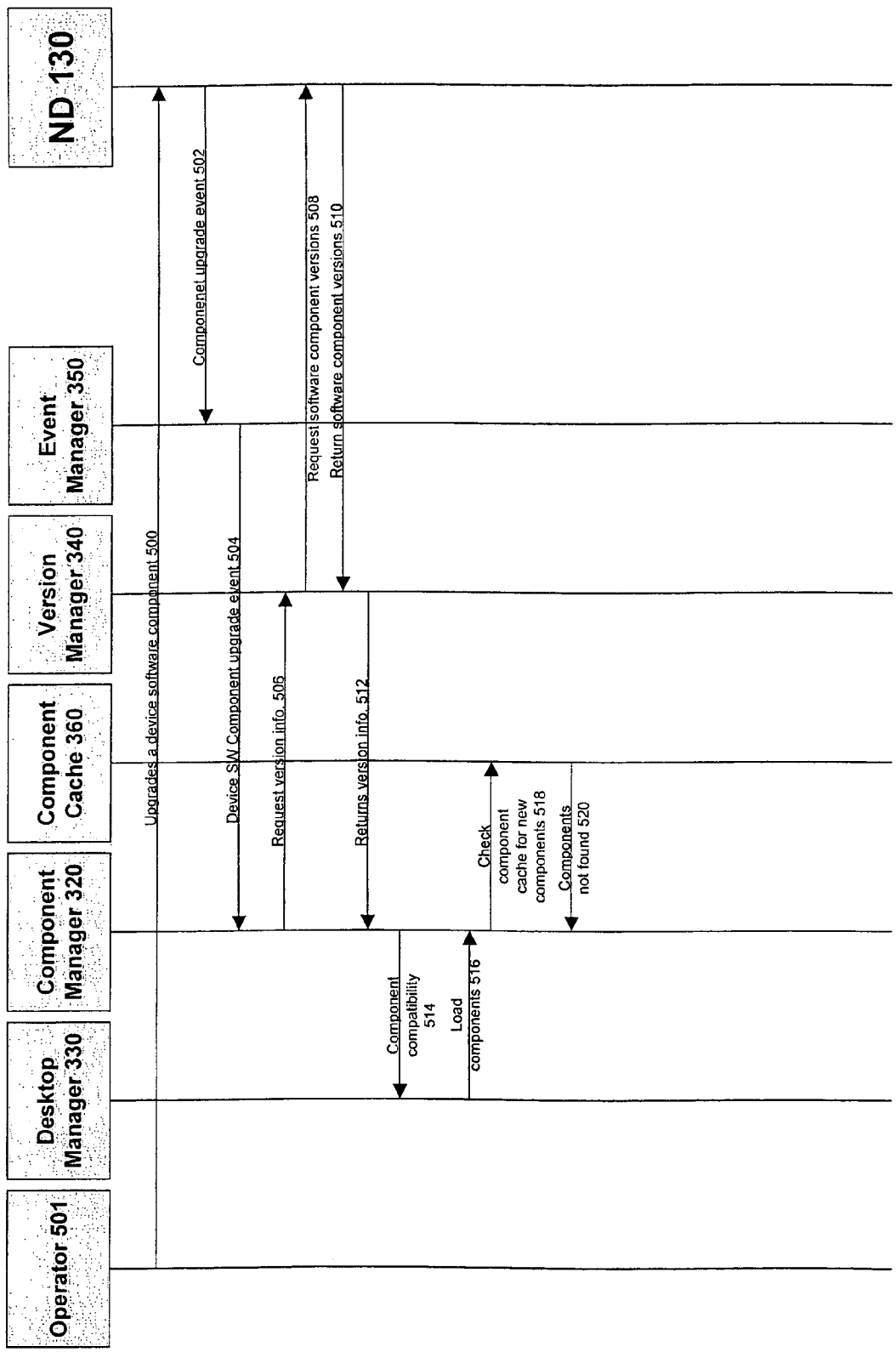
FIG. 5 illustrates a time sequence diagram of one embodiment of a method of managing multiple software component versions responding to a software component update.

FIG. 5 illustrates a time sequence diagram of one embodiment of the processing engine 310 responding to a software component update. For the following discussions, suppose the processing engine 310 has been launched and the operator 501 upgrades the software component 140 on the network device 130 at time 500. The operator 501's upgrade operation causes the software component 140, or an associated upgrade or management system, to generate an upgrade event on a bus associated with the event manager 350. The event manager 350 detects the upgrade event at time 502 and alerts the component manager 320 of the upgrade event.

To determine whether the upgrade affects other software components on the network system 100, the component manager 320 requests version information from the version manager 340 at time 506. In this instance, because the upgrade event has just occurred, the version manager 340 does not have the latest version information and thus proceeds to request the version number of the upgraded software component 140 from the network device 130. Alternatively, the version manager 340 may ask for the version numbers of all the software components that are on the network device.

After the version manager 340 receives the requested version information, it relays the information to the component manager 320 at time 512. One embodiment of the component manager 320 assesses compatibility based on a compatibility matrix. An example of the matrix is shown in Table 1.

TABLE 1

EXAMPLE COMPATIBILITY MATRIX

| A(1.0) | A(1.1) | A(1.2) |
|--------|--------|--------|
| B      |        |        |
| C      | C      |        |
| D      | D      | D      |

As an illustration, the first row of the matrix represents software releases of a software component A. A(1.0) indicates a major release, and A(1.1) and A(1.2) indicate minor releases. 1.0, 1.1, and 1.2 are the version numbers that represent the releases. B is a software component that "depends" on A. In other words, B relies on certain functionality of A to perform tasks of B. The second row indicates that B only needs to be changed to be compatible with A when there is a major release of A, such as A(1.0). Thus, when A moves to release 1.1 or to 1.2, B can remain the same and still be compatible with A.

Similarly, C and D are also software components that depend on A. Unlike B, C needs to be changed even when A moves to a minor release, such as A(1.1). D needs to be changed whenever A has a new release, regardless of the nature of the release.

A description of an alternative compatibility matrix approach that can be used in one embodiment is described in co-pending U.S. patent application Ser. No. 10/638,149, filed Aug. 7, 2003, entitled "Method and Apparatus for Providing Interoperation of Computer Processes of Different Versions," of Donald E. Banks et al. ("Banks et al."), the entire contents of which is hereby incorporated by reference for all purposes as if fully set forth herein.

With such a matrix, one embodiment of the component manager 320 goes through all the software components that depend on the software component 140 to determine whether they need to be changed. For illustration purposes, suppose the software components that depend on the software component 140 are the software component 150 and also components of the processing engine 310. Also, suppose the software component 140, the software component 150, and the processing engine 310 correspond to the software components A, B, and C, respectively. Assume further that the software component 140 is upgraded to release 1.1. According to the matrix as shown in Table 1, the software component 150 can remain the same, but a new version of the processing engine 310 is needed.

Various approaches can be used for the component manager 320 to track the dependencies among various software components. In one approach, the software components that are managed by the network management system 120 are designed to include dependency information. During the launch sequence of one example embodiment of the processing engine 310, the component manager 320 obtains such dependency information from the software components. In another approach, the component manager 320 formulates and maintains the dependency information based on past history of upgrading software components on the network system 100. For example, if upgrading the software component 140 in the past triggered an incompatibility error with certain components of the processing engine 310, the component manager 320 maintains that dependency relationship between the two components. Approaches described in Banks et al. also may be used.

In addition to the dependency information, the component manager 320 may also maintain dependency attribute information. Some examples of dependency attributes include, without limitation, whether the software component D should be automatically loaded if the software component A is upgraded or whether data that D operates on should be refreshed after the upgrade of D.

Continuing on with the example described herein, in which the component manager 320 relays its compatibility assessment that a new version of certain components of the processing engine 310 are needed to the desktop manager 330, the desktop manager 330 instructs the component manager 320 to load the new components at time 516. The component manager 320 first checks if the new components have already been loaded into the component cache 360. If such components exist, the component 320 is then responsible for discarding the existing versions of the software components from memory and loading the new versions into memory. In one implementation, this loading of the new software components is achieved via a custom class loader mechanism. As a result, the network management system 120 does not need to be shut down or restarted for the newly loaded components to take effect. In other words, this discarding and loading processes are accomplished in the same instance of the network management system 120 that downloads the new versions from private or public sources.

However, if no components are in the component cache 360 at time 520, the component manager 320 has several options. In one approach, the component manager 320 informs the desktop manager 330 of the exact components that need to be upgraded. The desktop manager 330 then instructs the user via the user interface 300 to manually download these components. Alternatively, based on the dependency attributes that are associated with these new components, the desktop manager 330 may automatically download the appropriate versions of the components from private or public data sources, such as intranet or Internet sites. Further, the desktop manager 330 may also refresh the data that the updated software components operate on.

2.3 Example Implementation

Figure 6:
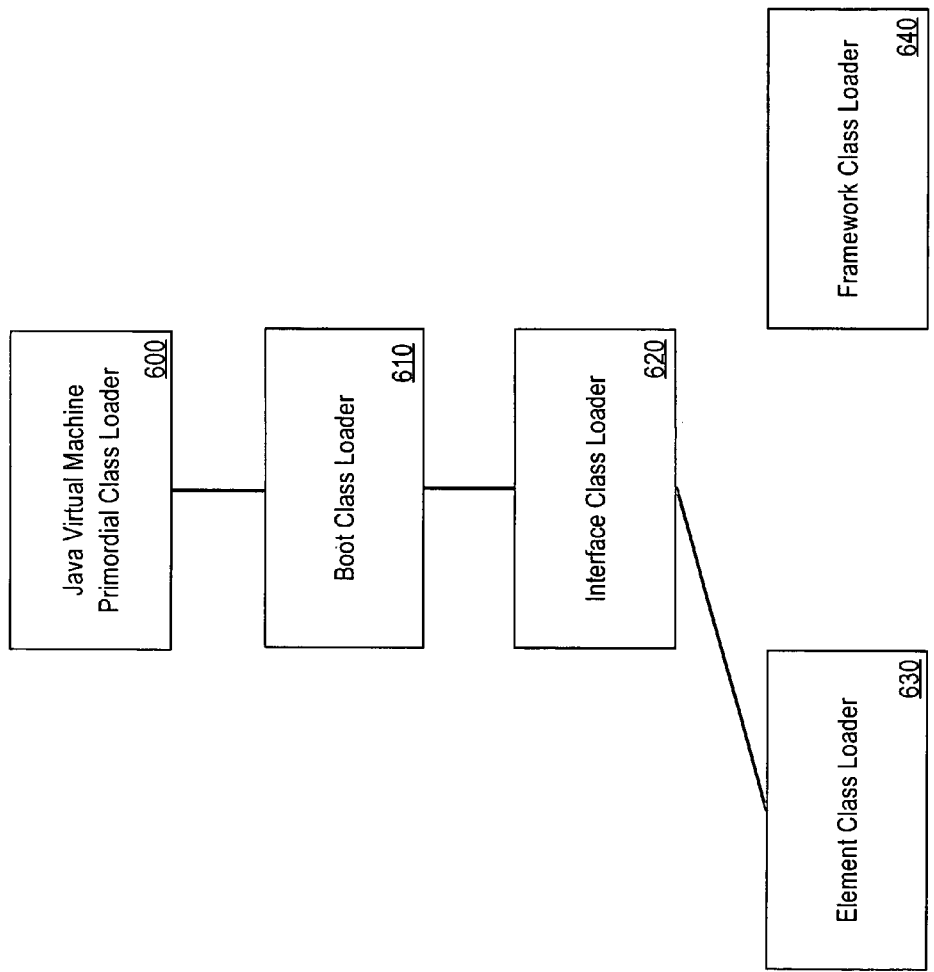
FIG. 6 illustrates a class loader hierarchy for one example embodiment of a method of managing multiple software component versions.

One example embodiment of the processing engine 310 is a JAVA application that utilizes a hierarchy of class loaders. FIG. 6 illustrates one such hierarchy. In this implementation, each class loader has a different namespace. The interface class loader 620 uses the built-in primordial class loader 600 as its parent. Thus, it will attempt to load classes first using the CLASSPATH and then from the interface JAVE Archive ("JAR"). The framework class loader 640 uses the interface class loader 620 as its parent. Thus, it will attempt to load classes first using the CLASSPATH, then the interface JAR, and finally the framework JAR. The element class loader 630 also uses the interface class loader 620 as its parent. Thus, it will attempt to load classes first using the CLASSPATH, then the interface JAR, and finally the element JAR. This implementation ensures that framework and element classes refer to each other only through interfaces. Since framework classes cannot access classes in the element JAR, and element classes cannot access classes in the framework JAR, they use the interfaces in the common interface JAR to communicate.

With this hierarchical architecture, the processing engine 310 uses multiple instances of a custom class loader (which may be named, in one embodiment, "CWIClassLoader") to manage the namespaces for each network device type and software component versions. Specifically, an Interface Class Loader ("ICL"), which is an instance of the CWIClassLoader class, loads from the associated interface JAR. The ICL also has a parent class loader that loads built-in JAVA classes. A Framework Class Loader ("FCL"), which is also an instance of the CWIClassLoader class, loads from the associated framework JAR. The parent of this class loader will be the ICL. Thus, the search path for the FCL is as follows: first look for a built-in Java class, second look for an interface class, and finally look for a class in the network JAR. An instance of an Element Class Loader ("ECL") exists for each device type and software component version. These instances also have the ICL as their parent. Thus, the search path for ECL is as follows: first look for a built-in Java class, second look for an interface class, then third look for a class in the element specific JAR.

To verify the compatibility of various versions of software, this JAVA implementation of the processing engine 310 involves at least the following steps:

1. Download the boot JAVA Archive ("JAR") file from a network device;
2. Download the interface and framework JARs if necessary;
3. Confirm that the interface and framework are compatible with each other;
4. Obtain network device type and version from the network device;
5. Check if the network device JAR file is available locally;
6. Check compatibility between the interface JAR file and the network device JAR file;
7. Get the network device JAR file and cache it with both version number and device type; and
8. Construct class loaders for that device type and version number.

3.0 EXTENSIONS AND ALTERNATIVES

In the foregoing specification, the network management system 120 has been described with reference to specific embodiments thereof. It will, however, be evident that various modifications and changes may be made thereto without departing from the broader spirit and scope of the invention. For example, the functionality of the various managers in the processing engine 310 can either be combined or further divided. As an illustration, the functionality of the component manager 320 and the version manager 340 may be combined. On the other hand, the functionality of the desktop manager 330 may be further divided into additional functional blocks. The specification and drawings are, accordingly, to be regarded in an illustrative rather than a restrictive sense.

What is claimed is:

1. A method for managing versions of a plurality of software components on a network, comprising:
   detecting a version change to a first software component associated with a network device out of the plurality of the software components;
   automatically identifying a second software component out of the plurality of the software components that needs to be changed to be compatible with the first software component, wherein the second software component depends on the first software component;
   assessing the software dependencies and compatibilities of at least the first and second software components;
   downloading upgrades of the first and second software components from a network device;
   storing the upgrades of the first and second software components in a computer cache;
   a version manager maintaining version information of the upgrades of the first and second software components;
   checking the version information of the upgrades of the first and second software components stored in the computer cache;

storing the version manager in the component cache;
wherein the step of assessing the software dependencies and compatibilities is performed by a component manager which is directly connected to the component cache, and reads from the writes to the component cache;
the version manager maintaining the version information of the first and second software components of the network device including requesting the version information from the network device;
the version manager passing the version information to the component manager;
determining whether the component cache contains a current copy of the version manager;
requesting and receiving a current copy of the version manager from the network device; and
retrieving a current copy of the version manager from the component cache.

2. The method as recited in claim 1, further comprising:
collecting attributes of the second software component; and
automatically manipulating the second software component according to the attributes.

3. The method as recited in claim 2, wherein the manipulating further includes:
downloading an upgrade of the second software component as part of performing an instance of the method; and
replacing an existing version of the second software component with the upgrade of the second software component that has been downloaded in the same instance.

4. The method of claim 3, wherein the replacing of the software upgrades is achieved via custom class loader mechanism.

5. The method of claim 1, further comprising:
determining if the software upgrades are already loaded into the component cache.

6. The method of claim 1, further comprising:
determining if a specific software upgrade has already been loaded into the component cache.

7. A method for managing versions of a plurality of software components on a network, comprising:
detecting a version change to a first software component out of the plurality of the software components;
automatically identifying a second software component out of the plurality of the software components that needs to be changed to be compatible with the first software component, wherein the second software component depends on the first software component;
assessing the software dependencies and compatibilities of at least the first and second upgrades of software components;
collecting attributes of the second software component; and
automatically manipulating the second software component according to the attributes, wherein the manipulating step further comprises downloading a copy of an upgrade of the second software component and storing it within a component cache;
a version manager maintaining version information of upgrades of the first and second software components;
storing the upgrades of the first and second software components in a component cache; and
storing the version manager in the component cache;
wherein the step of assessing the software dependencies and compatibilities is performed by a component manager which is directly connected to the component cache, and reads from and writes to the component cache;
the version manager maintaining the version information of the first and second software components of a network device including requesting the version information from the network device;
the version manager passing the version information to a component manager;
determining whether the component cache contains a current copy of the version manager; and
requesting and receiving a current copy of the version manager from the network device; and
retrieving a current copy of the version manager from the component cache;

8. The method as recited in claim 7, wherein the downloading step further comprises:
downloading the upgrade of the second software component as part of performing an instance of the method; and
wherein the manipulating step further comprises replacing an existing version of the second software component with an upgrade of the second software component that has been downloaded in the same instance.

9. The method as recited in claim 7, further comprising:
checking version information of the upgrade of the second software component that is stored in the component cache to determine whether to perform the downloading step.

10. The method of claim 7, further comprising:
determining if the software upgrades are already loaded into the component cache.

11. The method of claim 7, further comprising:
determining if a specific software upgrade has already been loaded into the component cache.

12. An apparatus for managing versions of a plurality of software components on a network, comprising:
at least one processor and a memory;
a user interface; and
a processing engine, coupled to the user interface, wherein the processing engine further comprises:
an event manager that detects a version change to a first software component out of the plurality of the software components;
a component manager that in response obtains version information of first software component from a version manager and automatically identifies an upgrade to a second software component out of the plurality of the software components that needs to be changed to be compatible with the first software component, wherein the second software component depends on the first software component;
wherein the component manager automatically downloads the upgrade of the second software component and stores a copy of the upgrade of the second software component in a component cache, wherein the component manager is directly connected to the component cache and reads from and writes to the component cache;
a version manager maintaining version information of the upgrade of the second software component of a network device including requesting the version information from the network device;
checking the version information of the upgrade of the second software component stored in the component cache;
storing the version manager in the component cache;

the version manager passing the version information to the component manager;

determining whether the component cache contains a current copy of the version manager;

requesting and receiving a current copy of the version manager from the network device; and retrieving a current copy of the version manager from the component cache.

13. The apparatus as recited in claim 12, wherein the component manager informs an operator of the apparatus of the upgrade of the second software component via the user interface.

14. The apparatus as recited in claim 12, wherein the component manager checks version information of the upgrade of the second software component that is stored in the cache to determine whether to download a copy of the upgrade of the second software component.

15. The apparatus as recited in claim 12, wherein the processing engine further comprises:

a desktop manager, coupled to the component manager, wherein the desktop manager collects attributes of the second software component; and manipulates the second software component according to the attributes.

16. The apparatus as recited in claim 15, wherein the desktop manager manipulates the second software component by causing the component manager to download the copy of the upgrade version of the second software component as part of executing an instance of the processing engine; and replace an existing version of the second software component with the copy of the upgrade version of the second software component that has been downloaded in the same instance.

17. The apparatus of claim 16, wherein the desktop manager initializes the component manager so that the component manager can evaluate current states of the processing engine without considering any remnants from any prior instances of the processing engine.

18. The apparatus of claim 12, wherein the processing engine employs a metadata driven interface to communicate with the network devices.

19. The apparatus of claim 12, wherein a user activates the user interface via a launch applet.

20. The apparatus of claim 19, wherein the launch applet originates from a network device.

21. A computer-readable medium storing one or more sequences of instructions for managing a plurality of network devices on a network, which instructions, when executed by one or more processors, cause the one or more processors to:

detect a version change to a first software component out of the plurality of the software components; and automatically identify a second software component out of the plurality of the software components that needs to be changed to be compatible with the first software component, wherein the second software component depends on the first software component;

assess the software dependencies and compatibilities of at least the first and second upgrades of software components performed by a component manager which is directly connected to the component cache, and reads from and writes to the component cache;

download a copy of an upgrade of the second software component; and store a copy of the upgrade of the second software component in a component cache;

a version manager maintaining version information of the upgrades of the first and second software components of a network device including requesting the version information from the network device;

check the version information of the upgrades of the first and second software components stored in the component cache; and store the version manager in the component cache, pass the version information to the component manager;

determine whether the component cache contains a current copy of the version manager; request and receive a current copy of the version manager from the network device; and retrieve a current copy of the version manager from the component cache.

22. The computer-readable medium as recited in claim 21, further comprising instructions which, when executed by the one or more processors, cause the one or more processors to automatically download the copy of the upgrade of the second software component.

23. The computer-readable medium as recited in claim 22, further comprising instructions which, when executed by the one or more processors, cause the one or more processors to check version information of the copy of the upgrade of the second software component that is stored in the cache to determine whether to download the copy of the upgrade of the second software component.

24. The computer-readable medium as recited in claim 21, further comprising instructions which, when executed by the one or more processors, cause the one or more processors to collect attributes of the second software component; and automatically manipulate the second software component according to the attributes.

25. The computer-readable medium as recited in claim 24, further comprising instructions which, when executed by the one or more processors, cause the one or more processors to:

download a copy of the upgrade of the second software component; and replace an existing version of the second software component with the upgrade of the second software component that has been downloaded.

26. An apparatus for managing versions of a plurality of software components on a network, comprising:

at least one processor and a memory;

a user interface means; and a processing means, coupled to the user interface, wherein the processing means further includes:

a detection means for detecting a version change to a first software component out of the plurality of the software components; and a component manager means, stored within a component cache, for assessing the software dependencies and compatibilities for upgrades of the plurality of software components wherein the component manager means is directly connected to the component cache, reads from and writes to the component cache, and assesses the software dependencies and compatibilities of the software components;

a compatibility verification means for automatically identifying a second software component out of the plurality of the software components that needs to be changed to be compatible with the first software component, wherein the second software component depends on the first software component;

a version manager means for maintaining version information of the upgrade of the second software component of a network device including requesting the version information from the network device and passing the version information to the component manager;

checking the version information of the upgrade of the second software component stored in the component cache;

storing the version manager in the component cache;

determining whether the component cache contains a current copy of the version manager;

requesting and receiving a current copy of the version manager from the network device; and retrieving a current copy of the version manager from the component cache.

27. The apparatus as recited in claim 26, wherein the compatibility verification means automatically downloads an upgrade of the second software component.

28. The apparatus as recited in claim 26, wherein the compatibility verification means informs an operator of the apparatus of the second software component via the user interface means.

29. The apparatus as recited in claim 27, wherein the compatibility verification means checks version information of the copy of the upgrade of the second software component that is stored in the component cache to determine whether to download the upgrade of the second software component.

30. The apparatus as recited in claim 29, wherein the compatibility verification means stores a copy of a copy of the upgrade of the second software component in a component cache.

31. The apparatus as recited in claim 26, wherein the processing means further comprises:

a management means for collecting attributes of the second software component; and manipulating the second software component according to the attributes.

32. The apparatus as recited in claim 31, wherein the management means further comprises:

means for downloading a copy of an upgrade of the second software component as part of executing an instance of the processing means; and means for replacing an existing version of the second software component with the copy of the upgrade of the second software component that has been downloaded in the same instance.

* * * * *